United States Patent
Morris et al.

(10) Patent No.: US 12,197,494 B2
(45) Date of Patent: *Jan. 14, 2025

(54) OBJECT SEARCH SERVICE EMPLOYING AN AUTONOMOUS VEHICLE FLEET

(71) Applicant: GM Cruise Holdings LLC, San Francisco, CA (US)

(72) Inventors: Kyle John Morris, San Francisco, CA (US); Guozhen La, San Francisco, CA (US); Haven Lau, Markham (CA); Sam Tran, Daly City, CA (US); Zhi Yuan Sherwin Lau, Berkeley, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,386

(22) Filed: Aug. 31, 2023

(65) Prior Publication Data

US 2023/0409627 A1 Dec. 21, 2023

Related U.S. Application Data

(63) Continuation of application No. 17/515,374, filed on Oct. 29, 2021, now Pat. No. 11,782,969, which is a
(Continued)

(51) Int. Cl.
*G06K 9/00* (2022.01)
*G06F 16/2457* (2019.01)
(Continued)

(52) U.S. Cl.
CPC ...... *G06F 16/532* (2019.01); *G06F 16/24578* (2019.01); *G06F 16/5838* (2019.01);
(Continued)

(58) Field of Classification Search
CPC .. G05D 1/0033; G05D 1/0038; G05D 1/0044; G05D 1/0231; G05D 1/0214;
(Continued)

(56) References Cited

U.S. PATENT DOCUMENTS 6,741,655 B1  5/2004 Chang et al.
6,845,382 B2  1/2005 Meadows
(Continued)

OTHER PUBLICATIONS

"Non-Final Office Action for U.S. Appl. No. 16/363,664", Mailed Date: Apr. 29, 2021, 9 Pages.
(Continued)

*Primary Examiner* — Duy M Dang

(57) ABSTRACT

A computing system that can receive an object search request from a user indicating a request to search for a specific object in an area traversed by one or more autonomous vehicle. The object search request can include a set of physical characteristics of the specific object. The computing system can then transmit a signal to an autonomous vehicle indicating a request for the autonomous vehicle to search for the specific object. The signal can cause the autonomous vehicle to transmit an image, selected based on a physical characteristic of the object, to the computing system. The computing system can then generate a score indicative of a difference between one or more physical characteristic of the object in the image and the specific object. The computing system can then selectively transmit the image to a mobile device operated by the user based on the score.

20 Claims, 5 Drawing Sheets

Related U.S. Application Data continuation of application No. 16/363,664, filed on Mar. 25, 2019, now Pat. No. 11,163,820.

(51) Int. Cl.
*G06F 16/532* (2019.01)
*G06F 16/58* (2019.01)
*G06F 16/583* (2019.01)
*G05D 1/00* (2006.01)
*G06T 7/00* (2017.01)

(52) U.S. Cl.
CPC ....... *G06F 16/5866* (2019.01); *G05D 1/0033* (2013.01); *G05D 1/0231* (2013.01); *G05D 1/0272* (2013.01); *G05D 1/0276* (2013.01); *G05D 1/0291* (2013.01); *G06T 7/00* (2013.01)

(58) Field of Classification Search
CPC .. G05D 1/0212; G05D 1/0272; G05D 1/0276; G05D 1/0291; G06F 16/532; G06F 16/24578; G06F 16/5838; G06F 16/5866; G06T 7/00

See application file for complete search history.

(56) References Cited

U.S. PATENT DOCUMENTS

| | | | |
|---|---|---|---|
| 9,008,435 | B2 | 4/2015 | Gokturk et al. |
| 9,481,367 | B1 | 11/2016 | Gordon et al. |
| 9,483,948 | B1 | 11/2016 | Gordon et al. |
| 9,785,651 | B2 | 10/2017 | Boncyk et al. |
| 9,830,511 | B2 | 11/2017 | Saptharishi et al. |
| 11,163,820 | B1 | 11/2021 | Morris et al. |
| 11,782,969 | B2 * | 10/2023 | Morris .............. G06F 16/24578 |
| 2009/0044235 | A1 | 2/2009 | Davidson |
| 2013/0142398 | A1 | 6/2013 | Polimeno et al. |
| 2015/0131868 | A1 | 5/2015 | Rooyakkers et al. |
| 2018/0349685 | A1 | 12/2018 | Kolleri |
| 2019/0005310 | A1 | 1/2019 | Kim |
| 2022/0058217 | A1 | 2/2022 | Morris et al. |

OTHER PUBLICATIONS

"Reply to Non-Final Office Action for U.S. Appl. No. 16/363,664", Filed Date: Jul. 28, 2021, 9 Pages.
"Notice of Allowance and Fees Due for U.S. Appl. No. 16/363,664", Mailed Date: Aug. 24, 2021, 7 Pages.
"Notice of Allowance and Fees Due for U.S. Appl. No. 17/515,374", Mailed Date: Jun. 1, 2023, 8 pages.
"Office Action for U.S. Appl. No. 17/515,374", Mailed Date: Feb. 6, 2023, 12 pages.
"Response to the Office Action for U.S. Appl. No. 17/515,374", Filed Date: May 8, 2023, 9 pages.

* cited by examiner

OBJECT SEARCH SERVICE EMPLOYING AN AUTONOMOUS VEHICLE FLEET

CROSS-REFERENCE TO RELATED APPLICATION

This application is a continuation of U.S. patent application Ser. No. 17/515,374, filed on Oct. 29, 2021, and entitled "OBJECT SEARCH SERVICE EMPLOYING AN AUTONOMOUS VEHICLE FLEET", which is a continuation of U.S. Pat. No. 11,163,820, filed on Mar. 25, 2019, and entitled "OBJECT SEARCH SERVICE EMPLOYING AN AUTONOMOUS VEHICLE FLEET", the entireties of which are incorporated herein by reference.

BACKGROUND

Every year, millions of pets go missing in the United States, which means on average one in three pets may go missing during their lifetime. Conventionally, when a pet goes missing, an owner creates and posts lost-dog signs and/or manually searches a nearby area in hopes of finding the lost pet. This process can be time consuming and can result in a limited or inefficient search for the pet. To overcome these flaws, some systems have been created in which a pet is preregistered in a database using a trait unique to the pet (e.g., pore and crease patterns on the noses of dogs). If a third-party locates the missing pet, the third-party can identify the unique trait of the pet and can compare the trait to data in the database to determine the owner of the dog.

SUMMARY

The following is a brief summary of subject matter that is described in greater detail herein. This summary is not intended to be limiting as to scope of the claims.

Described herein are various technologies pertaining to using one or more autonomous vehicles to search for a specific object in an environment. With more specificity, a user can submit an object search request to a computing system. The object search request can specify a specific object to desirably be located in the environment by a fleet of autonomous vehicles. Responsive to receipt of the object search request, the computing system can transmit a signal to one or more autonomous vehicles in the environment indicating that the autonomous vehicle(s) should passively search for the specific object. The autonomous vehicles passively search for the specific object because they may look for the specific object while traveling along a route generated for a third-party user and may not be routed based on the object search request.

Subsequent to receipt of the signal at an autonomous vehicle, an image that potentially depicts the specific object can be captured by the autonomous vehicle (e.g., utilizing camera(s) of the autonomous vehicle, while passively searching for the specific object) and transmitted to the computing system. Further, the image captured by the autonomous vehicle may be transmitted from the computing system to a device operated by the user (e.g., a mobile computing device) to determine whether the image depicts the specific object.

According to various embodiments, images captured by an autonomous vehicle subsequent to receipt of the signal can be filtered at least twice before being transmitted to the device. First, the images can be filtered by the autonomous vehicle before being transmitted to the computing system. The images can further be filtered by the computing system before being sent to the device.

When the user submits the object search request, the user can provide a set of characteristics for the specific object. The signal transmitted to the autonomous vehicle can include one or more characteristic of the set of characteristics. The autonomous vehicle can use the characteristic to determine whether an object in an image captured by the autonomous vehicle and the specific object share the characteristic. The autonomous vehicle can generate a score based on a difference between the characteristic of the object in the image and the characteristic of the specific object and then use that score to select which image(s) to transmit to the computing system.

Similarly, the computing system can use one or more characteristic of the set of characteristics to determine whether an object in an image captured by the autonomous vehicle and the specific object share the characteristic. The computing system can generate a score based on a difference between the characteristic of the object in the image and the characteristic of the specific object and then use that score to select which image(s) to transmit to the device. The characteristic(s) compared by the autonomous vehicle and the characteristic(s) compared by the computing system may be the same characteristic(s) or may be different characteristic(s).

In one example, the specific object comprises a dog that is missing. In another example, the specific object comprises a person (e.g., child) that is missing. The set of characteristics submitted by the user may vary based on the specific object.

The above-described technologies present various advantages over conventional object search approaches. Unlike the conventional approach of preregistering in a database a trait unique to an object and relying on a third-party who finds the object to then check the database for the trait, the above-described technologies allow a user to submit characteristics to a computing system which in turn disseminates the characteristics to multiple autonomous vehicles that can identify the specific object in an environment. Moreover, the above-described technologies permit a user to leverage the fact that autonomous vehicles provide mobile cameras that are continuously scanning the environment to cooperatively search a large area for the specific object.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
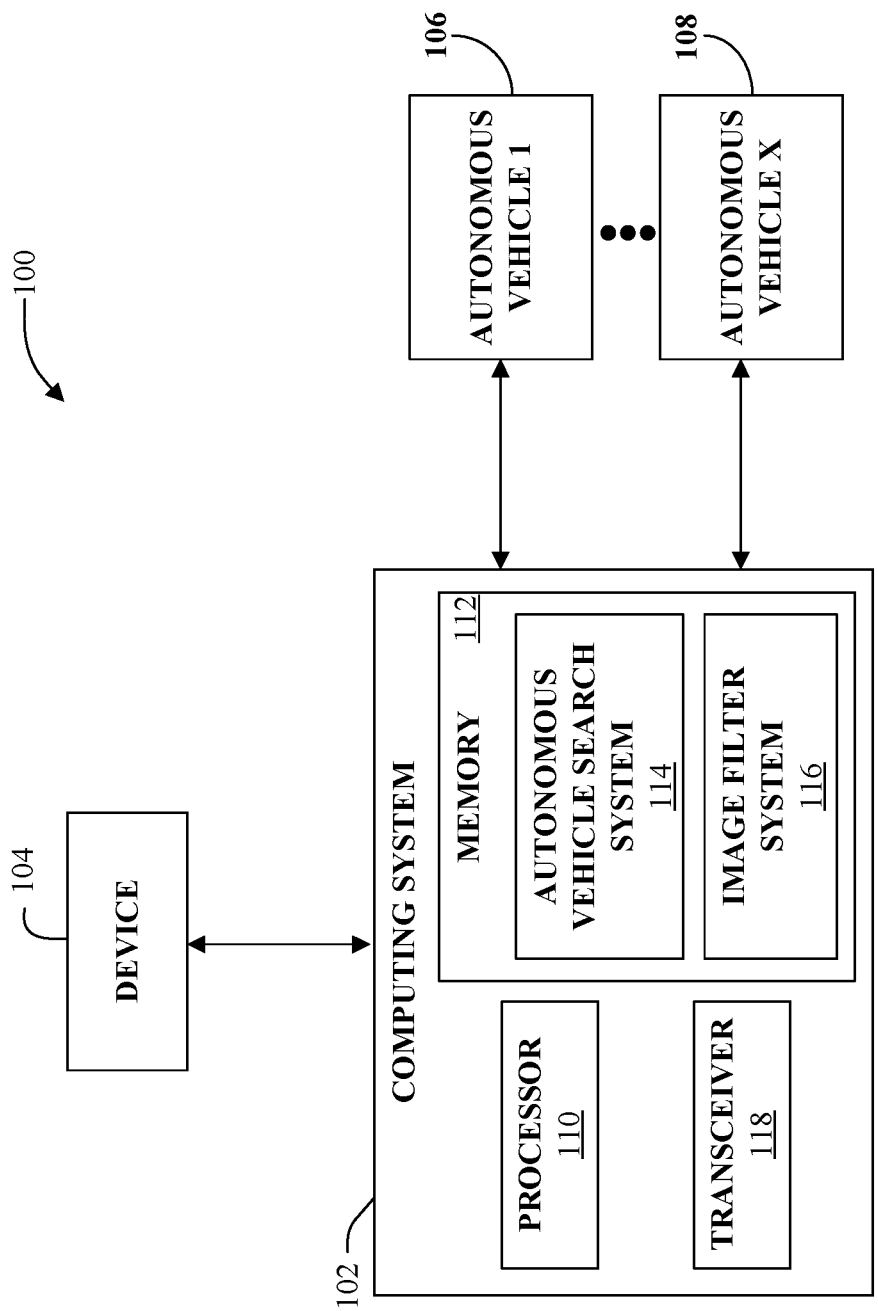
FIG. 1 illustrates an exemplary system configured to provide an object search service that utilizes an autonomous vehicle fleet.

Various technologies pertaining to an object search service that employs an autonomous vehicle fleet are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Moreover, as used herein "child" is intended to encompass a minor and/or someone legally incapable of managing his or her own affairs.

Disclosed are various technologies that generally relate to employing a fleet of autonomous vehicles to passively search for a specific object while the autonomous vehicles travel in an environment. A computing system receives an object search request from a user (e.g., from a device of the user) indicating a request to search for a specific object and then transmits a signal to one or more autonomous vehicles in the fleet to search for the specific object. The object search request may include a set of characteristics that may then be disseminated to the autonomous vehicles. Subsequent to receipt of the signal, an image captured by an autonomous vehicle may be transmitted to the computing system; the computing system can send such image to the device operated by the user to determine whether the image depicts the specific object. Images captured by the autonomous vehicles in the fleet can be filtered at least twice before being transmitted to the device. First, the images can be filtered by the autonomous vehicles before being transmitted to the computing system. The images can further be filtered by the computing system before being sent to the device.

With reference now to FIG. 1, illustrated is a system 100 configured to provide an object search service that utilizes an autonomous vehicle fleet. One or more autonomous vehicles in the fleet can passively search for a specific object. More specifically, in the system 100, an autonomous vehicle can initially filter images captured by the autonomous vehicle to select images that show an object with a physical characteristic similar to a physical characteristic of the specific object. The autonomous vehicle then transmits the selected images to a computing system, which can perform further filtering of the selected images based on another physical characteristic. Subsequent to the filtering performed by the computing system, the computing system can transmit one or more of the selected images (as filtered) to the user who can review to determine if any of the images include the specific object.

In one embodiment, illustrated in FIG. 1, the system 100 includes a computing system 102 (e.g., a server computing system) that is in communication with a device 104. The device 104 can comprise any suitable device operable by a user for interaction with the computing system 102. For instance, the device 104 can comprise a mobile computing device (e.g., a smartphone, a tablet computing device, a wearable computing device, etc.). By way of another example, the device 104 can comprise a personal computer. In order to transmit data to the computing system 102 and/or receive data from the computing system 102, the device 104 can include a transceiver (not pictured). The transceiver is configured to transmit data from the device 104 and/or receive data at the device 104. Thus, the device 104 can be in communication with the computing system 102.

In the illustrated embodiment, the computing system 102 is in communication with a plurality of autonomous vehicles, namely, autonomous vehicle 1 106, . . . , and autonomous vehicle X 108, where X can be substantially any integer greater than or equal to 2 (collectively referred to herein as autonomous vehicles 106-108). The autonomous vehicles 106-108 may be in the same fleet of autonomous vehicles and/or may be part of different fleets of autonomous vehicles. In another embodiment, the computing system 102 can be in communication with a single autonomous vehicle.

In order to transmit data to the device 104 and/or the autonomous vehicles 106-108 and/or receive data therefrom, the computing system 102 may further include a transceiver 118. The transceiver 118 is configured to transmit data from the computing system 102 and/or receive data at the computing system 102. Thus, the computing system 102 can be in communication with the device 104 and/or the autonomous vehicles 106-108.

The computing system 102 is configured to receive an object search request from the device 104 and, in response to receiving the object search request, to transmit a signal to one or more of the autonomous vehicles 106-108. The object search request can indicate a request entered by a user of the device 104 for a search for a specific object in an area traversed by the one or more autonomous vehicles (e.g., from the autonomous vehicle 106-108). The signal transmitted to the autonomous vehicle(s) can indicate a request for the autonomous vehicle(s) to conduct a search for a specific object while the autonomous vehicle(s) travels through a search area that is located along a route the autonomous vehicle is following in an environment.

In the following embodiments, the routes taken by the autonomous vehicles 106-108 may be set by one or more third-party users independent of the search request. Thus, the system 100 allows a user to leverage already running image capturing being performed by an autonomous vehicle as it travels along a route to examine a search area that is located along the route, without requiring an autonomous vehicle to be routed to examine the search area. However, it is contemplated that the system 100 can employ one or more autonomous vehicles that are dispatched to examine the search area (e.g., for a specific object).

While the user submits the request in the device 104, the user may also enter a set of one or more characteristics of the specific object. The set of characteristics can include any feature or trait that can be used by the computing system 102 and/or the autonomous vehicles 106-108 to filter images. For example, the characteristic can comprise a visually apparent (e.g., physical) characteristic of the specific object.

The specific object can include anything capable of being perceived by an autonomous vehicle. For example, the specific object can comprise a pet (e.g., dog, cat, etc.) that is missing. In another example, the specific object can comprise a missing person (e.g., missing child). In a further example, the specific object can comprise a bag (e.g., purse, luggage) that may have been stolen and/or misplaced by the user of the device 104.

The characteristic(s) of the specific object can be entered into the system 100 via any suitable process. For instance, the user of the device 104 can be prompted to enter certain characteristics for the specific object (e.g., color, last known location, breed of dog, etc.) when the user is making a request. Additionally, or alternatively, the user may provide or select a photograph of the specific object using the device 104, which can in turn be used, e.g. by the computing system 102, to determine certain characteristics of the specific object. For example, a user can select a photograph of their dog that is missing and the computing system 102 can be configured to detect certain characteristics of the dog based on the photograph.

The characteristics entered by the user may depend on the specific object. For instance, where the specific object comprises a dog, the characteristic can include one or more of breed of the dog, height of the dog, weight of the dog, color of the dog, age of the dog, name of the dog, unique identifier of the dog (e.g., birthmark, physical abnormality), and/or the like. In another example, where the object comprises a missing child, the characteristic can include one or more of age of the child, name of the child, wardrobe of the child, height of the child, weight of the child, and/or the like.

The signal transmitted from the computing system 102 to the autonomous vehicle can specify one or more of these characteristics. Additionally, or alternatively, the signal may include a machine learning model trained to identify the one or more specified characteristics. The characteristic can then be used by a computing system of the autonomous vehicle to filter images captured by the autonomous vehicle, as will be described in detail below. The signal transmitted from the computing system 102 to the autonomous vehicle can further be configured to cause the autonomous vehicle to transmit one or more selected images to the computing system 102. The image(s) may be selected by the autonomous vehicle based on the characteristic of the specific object included in the signal. The image(s) are selected because they include an object with a characteristic similar to the characteristic of the specific object included in the signal.

Responsive to receiving one or more selected images, the computing system 102 may be further configured to generate a score indicative of a difference between one or more characteristic of the set of characteristics of the specific object and the object in the image. Responsive to generating the score, the computing system 102 may be yet further configured to transmit the image to the device 104 operated by the user based on the score (e.g., if the score is below a threshold amount).

The computing system 102 may be further configured to transmit different signals based on locations of the autonomous vehicles 106-108 in an environment. For instance, a search area in the environment can be defined and when an autonomous vehicle enters the search area, the computing system 102 can transmit a signal indicating a request for the autonomous vehicle to search for the specific object. In the same example, when the autonomous vehicle exits the defined search area, the computing system 102 can transmit a different signal indicating that the autonomous vehicle should refrain from searching for the specific object.

Alternatively, the computing system 102 may transmit the same signal to the autonomous vehicle 106-108 regardless of where the autonomous vehicle 106-108 is located. In this embodiment, the signal transmitted by the computing system 102 to the autonomous vehicles 106-108 may include information indicative of the defined search area and instruction for the autonomous vehicles 106-108 to search for the specific object while located within the defined search area. The signal may further indicate that the autonomous vehicle 106-108 not search for the specific object while outside of the defined search area.

In order to achieve the actions described above, the computing system 102 can include a processor 110 and memory 112 that includes computer-executable instructions that are executed by the processor 110. The memory 112 may include an autonomous vehicle search system 114 and/or an image filter system 116, which are described in detail below.

The autonomous vehicle search system 114 is configured to transmit a signal to one or more of the autonomous vehicles 106-108. The autonomous vehicle search system 114 may be configured to transmit different signals based on a location of the autonomous vehicle. More specifically, the autonomous vehicle search system 114 may transmit a first signal when an autonomous vehicle enters or is in a search area. Whereas, the autonomous vehicle search system 114 may transmit a different, second signal when an autonomous vehicle exits a search area.

The search area may be defined by any suitable process for defining a confined search area. The search area may be centered around any suitable geographic location. For instance, the search area can be centered at a location of the device 104 when the request is transmitted to the computing system 102. In another example, the search area can be centered at a predefined domicile of the user. In a yet further example, the search area can be centered at a last known location of the specific object defined by the user when the user enters the request into the device 104.

In one example, size of the search area may be defined by the user when the user enters the request into the device 104. In an embodiment, the user can define an explicit search area size (e.g., five mile radius, 10 blocks, etc.) when the user enters the request in the device 104. In another embodiment, the user can select a predefined search area size (e.g., small search area size, medium search area size, large search area size) when the user enters the request in the device 104. The search area size can be predefined in the computing system 102 and when the user selects a predefined search area size, the computing system 102 then applies the predefined size. The predefined search area sizes can be similar for different types of specific objects and/or can vary based on the type of specific object.

In another example, the size of the search area may be defined by the computing system 102. For instance, the computing system 102 may define the search area size based on mobility of the specific object, last known location of the specific object, amount of time from when the specific object was last seen to when the request was entered by the user, and/or the like.

As the autonomous vehicles 106-108 travel along routes, the autonomous vehicle search system 114 can receive geographic locations of the autonomous vehicles 106-108 and can be configured to compare the geographic location of an autonomous vehicle with one or more search areas. The autonomous vehicle search system 114 can be configured to transmit a first signal indicating a request for an autonomous vehicle to search for a specific object when the autonomous vehicle enters and/or is in a search area. The autonomous vehicle search system 114 can be configured to transmit a second signal indicating the autonomous vehicle should stop searching for the specific object when the autonomous vehicle leaves the search area.

The autonomous vehicle search system 114 can be further configured to transmit one or more characteristic of the specific object to the autonomous vehicle in addition to the first signal. The autonomous vehicle search system 114 may transmit to the autonomous vehicle all of the characteristics entered by the user or may select a portion of the characteristic(s) for transmission to the autonomous vehicle. The autonomous vehicle search system 114 can be configured to select which characteristic(s) to transmit to the autonomous vehicle based on any suitable factor. For instance, the transmitted characteristic may be selected based on computational power needed for the autonomous vehicle to filter images based on that characteristic.

Responsive to receiving the first signal from the computing system 102, one or more of the autonomous vehicles 106-108 may transmit a selected image to the computing system 102. The image filter system 116 is configured to receive the selected image from the autonomous vehicles 106-108 and to determine whether the selected image should be sent to the device 104. More specifically, the image filter system 116 is configured to perform a second filtering step on the images received from the autonomous vehicles 106-108 to select images that are sent to the device 104. Thus, the image(s) transmitted from the computing system 102 to the device 104 have been filtered twice to remove to images that do not share a characteristic(s) with the specific object. The user of the device 104 can then look through the image(s) received at the device to determine whether the image includes the specific object.

The image filter system 116 can filter the images received from the autonomous vehicles 106-108 by generating a score that is indicative of a difference between one or more characteristic of the set of characteristics of the specific object and the object in the image. This score can then be used to determine whether the image should be transmitted to the device 104. According to an example, only images with a score below a predefined threshold can be transmitted to the device 104 from the computing system 102.

In addition to filtering the images received from the autonomous vehicles 106-108 based on one or more characteristics in the set of characteristics, the image filter system 116 may be configured to filter the images based on the environment surrounding the object. For example, where the specific object comprises a dog, the image filter system 116 may filter out images of dogs that are attached to a leash that is held by a person. According to another example, the autonomous vehicles 106-108 can inhibit images of dogs on leashes from being transmitted to the computing system 102.

Figure 2:
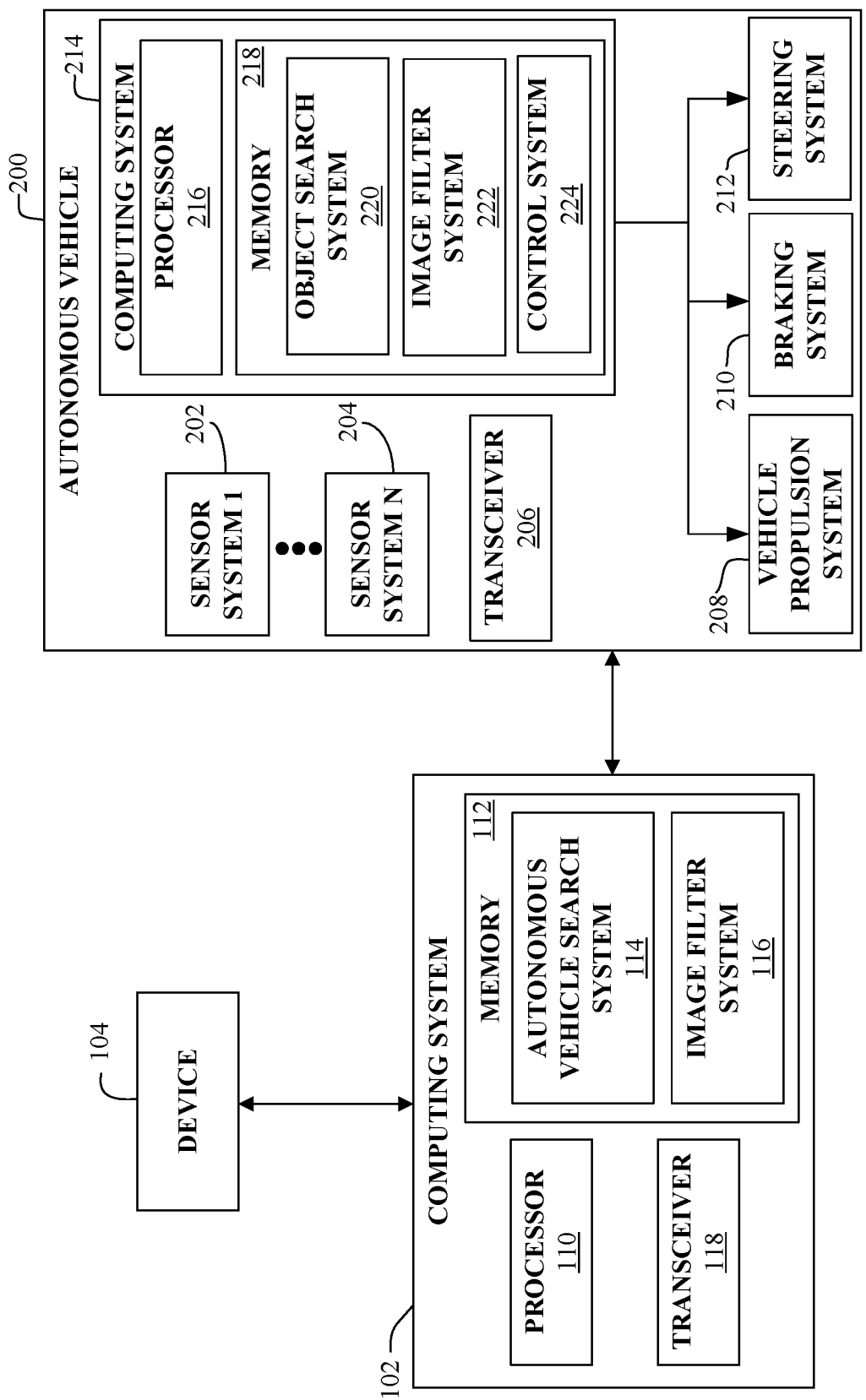
FIG. 2 illustrates an exemplary computing system in communication with an exemplary autonomous vehicle.

Turning now to FIG. 2, illustrated is an exemplary autonomous vehicle 200 (e.g., one of the autonomous vehicles 106-108) that is in communication with the computing system 102. The autonomous vehicle 200 can navigate about roadways without human conduction based upon sensor signals output by sensor systems of the autonomous vehicle 200. The autonomous vehicle 200 includes a plurality of sensor systems, namely, a sensor system 1 202, . . . , and a sensor system N 204, where N can be substantially any integer greater than or equal to 2 (collectively referred to herein as sensor systems 202-204). The sensor systems 202-204 are of different types and may be arranged about the autonomous vehicle 200. For example, the sensor system 1 202 may be a lidar sensor system and the sensor system N 204 may be a camera (image) system. Other exemplary sensor systems 202-204 included are radar sensor systems, global positioning system (GPS) sensor systems, sonar sensor systems, infrared sensor systems, and the like.

The autonomous vehicle 200 further includes several mechanical systems that are used to effectuate appropriate motion of the autonomous vehicle 200. For instance, the mechanical systems can include, but are not limited to, a vehicle propulsion system 208, a braking system 210, and a steering system 212. The vehicle propulsion system 208 may be an electric motor, an internal combustion engine, a combination thereof, or the like. The braking system 210 can include an engine brake, brake pads, actuators, and/or any other suitable componentry that is configured to assist in decelerating the autonomous vehicle 200. The steering system 212 includes suitable componentry that is configured to control the direction of the movement of the autonomous vehicle 200.

Similar to the computing system 102, in order to transmit data and/or receive data, the autonomous vehicle 200 may further include a transceiver 206. The transceiver 206 is configured to transmit data from the autonomous vehicle 200 and/or receive data at the autonomous vehicle 200. Thus, the autonomous vehicle 200 can be in communication with the computing system 102.

The autonomous vehicle 200 additionally comprises a computing system 214 that is in communication with the sensor systems 202-204, the transceiver 206, the vehicle propulsion system 208, the braking system 210, and/or the steering system 212. The computing system 214 includes a processor 216 and memory 218 that includes computer-executable instructions that are executed by the processor 216. In an example, the processor 216 can be or include a graphics processing unit (GPU), a plurality of GPUs, a central processing unit (CPU), a plurality of CPUs, an application-specific integrated circuit (ASIC), a microcontroller, or the like.

The memory 218 includes a control system 224 configured to control operation of the vehicle propulsion system 208, the braking system 210, and/or the steering system 212. The memory 218 may further include an object search system 220 configured to receive the signal transmitted from the computing system 102. The memory 218 may yet further include an image filter system 222 configured to select which images captured by the autonomous vehicle 200 are transmitted to the computing system 102.

The object search system 220 is configured to receive the signal transmitted from the computing system 102 and to cause the autonomous vehicle 200 to filter images captured by the autonomous vehicle 200 (e.g., by a camera system of the autonomous vehicle 200) for transmission to the computing system 102. The object search system 220 can assign one or more specific object characteristic to the image filter system 222. The object search system 220 may be configured to select which specific object characteristic is assigned to the image filter system 222. For instance, where the signal from the computing system 102 includes a set of specific object characteristics, the object search system 220 may assign a subset of the specific object characteristics for use by the image filter system 222. The subset of the specific object characteristics assigned to the image filter system 222 may be determined based on any suitable factors. For instance, the subset may be decided based on an amount of computational power required for image filter system 222 to filter images captured by the autonomous vehicle 200 based on that subset of the specific object characteristics.

The image filter system 222 can then use the characteristic(s) of the specific object from the object search system 220, to filter through images captured by the autonomous vehicle 200. The images may be captured by one or more of the sensor systems 202-204 as the autonomous vehicle 200 operates. As the images are captured while the autonomous vehicle 200 is in the search area, the image filter system 222 may determine whether each image includes an object with a similar classification to that of the specific object. For instance, where the specific object comprises a yellow golden retriever dog, the image filter system 222 may determine whether an image includes a dog.

Responsive to the image filter system 222 determining that an image includes an object with a similar classification to that of the specific object, the image filter system 222 can then determine whether the object in the image and the specific object share the characteristic(s) from the object search system 220. Similar to the image filter system 116 of the computing system 102, the image filter system 222 of the autonomous vehicle 200 can generate a score that is indicative of a difference between the characteristic of the specific object and the object in the image. This score can then be used to select which image should be transmitted to the computing system 102. For instance, only images with a score below a predefined threshold will be transmitted to the computing system 102. For example, where the specific object comprises a yellow dog, after the image filter system 222 determines that the image includes a dog, the image filter system 222 can then determine whether the dog is yellow and to transmit images of yellow dogs to the computing system 102.

In addition to filtering the images captured by the sensor systems 202-204 based the characteristic(s) from the object search system 220, the image filter system 222 may configured to filter the images based on the environment surrounding the object. For example, where the specific object comprises a dog, the image filter system 222 may filter out images of dogs that are attached to a leash that is held by a person.

The characteristic of the specific object used by the image filter system 116 of the computing system 102 and the image filter system 222 of the autonomous vehicle 200 can be similar or can vary. For instance, the image filter system 222 of the autonomous vehicle 200 can filter images based on the color of the specific object while the image filter system 116 of the computing system 102 can filter images based on a size of the specific object. Advantageously, filtering based on a characteristic(s) that requires computationally lighter processing may be performed by the image filter system 222 of the autonomous vehicle 200, which may have a finite amount of processing power available and may be operating under a heavy demand to perform other processes. Whereas, filtering based on a characteristic(s) that requires computationally heavier processing may be performed by the image filter system 116 of the computing system 102, which may have a larger amount of processing power compared with the autonomous vehicle 200.

The image filter system 222 may also be configured to remove outer areas from an image, i.e. crop an image. The image filter system 222 can remove portions of the image based on a location of the object within the image. The image can be cropped to remove irrelevant noise from a periphery of the image, to change the image's aspect ratio, and/or magnify the object. This cropping step can be performed at any stage of the filtering performed by the autonomous vehicle 200. For example, the image can be cropped after it is determined that an image includes an object with a similar classification to that of the specific object but prior to the image filter system 222 filtering the image based on the characteristic(s) of the specific object. In another example, the image can be cropped after the image filter system 222 selects the image for transmission to the computing system 102.

The image filter system 222 may be further configured to transmit the one or more selected image at any suitable time. For instance, the image filter system 222 can transmit the selected image subsequent to selecting the image for transmission. In another example, the image filter system 222 can transmit the selected image when the autonomous vehicle 200 leaves the search area. In a further example, the image filter system 222 can transmit the selected image when the autonomous vehicle 200 enters a designated upload area.

In order to assist in locating the specific object, the image transmitted to the device 104 can include time and geographic location of the autonomous vehicle 200 when the sensor systems 202-204 capture the image. This information can be transmitted by the autonomous vehicle 200 simultaneous with the image filter system 222 transmitting a select image.

In addition to the above described capabilities, the computing system 102 may be further configured for a user to dispatch a specially designed autonomous vehicle based on the one or more images received at the device 104. More specifically, the user can indicate, e.g., via the device 104, that an image may include the specific object and can request that the specially designed autonomous vehicle be dispatched to a location associated with the image. The specially designed autonomous vehicle can be designed to potentially keep the specific object at the location the specially designed autonomous vehicle is dispatched too and/or to receive the specific object and transport it to the user. For instance, where the specific object is missing dog, the specially designed autonomous vehicle may be designed to externally emit the scent of dog food to try and keep the dog in a certain location.

Figure 3:
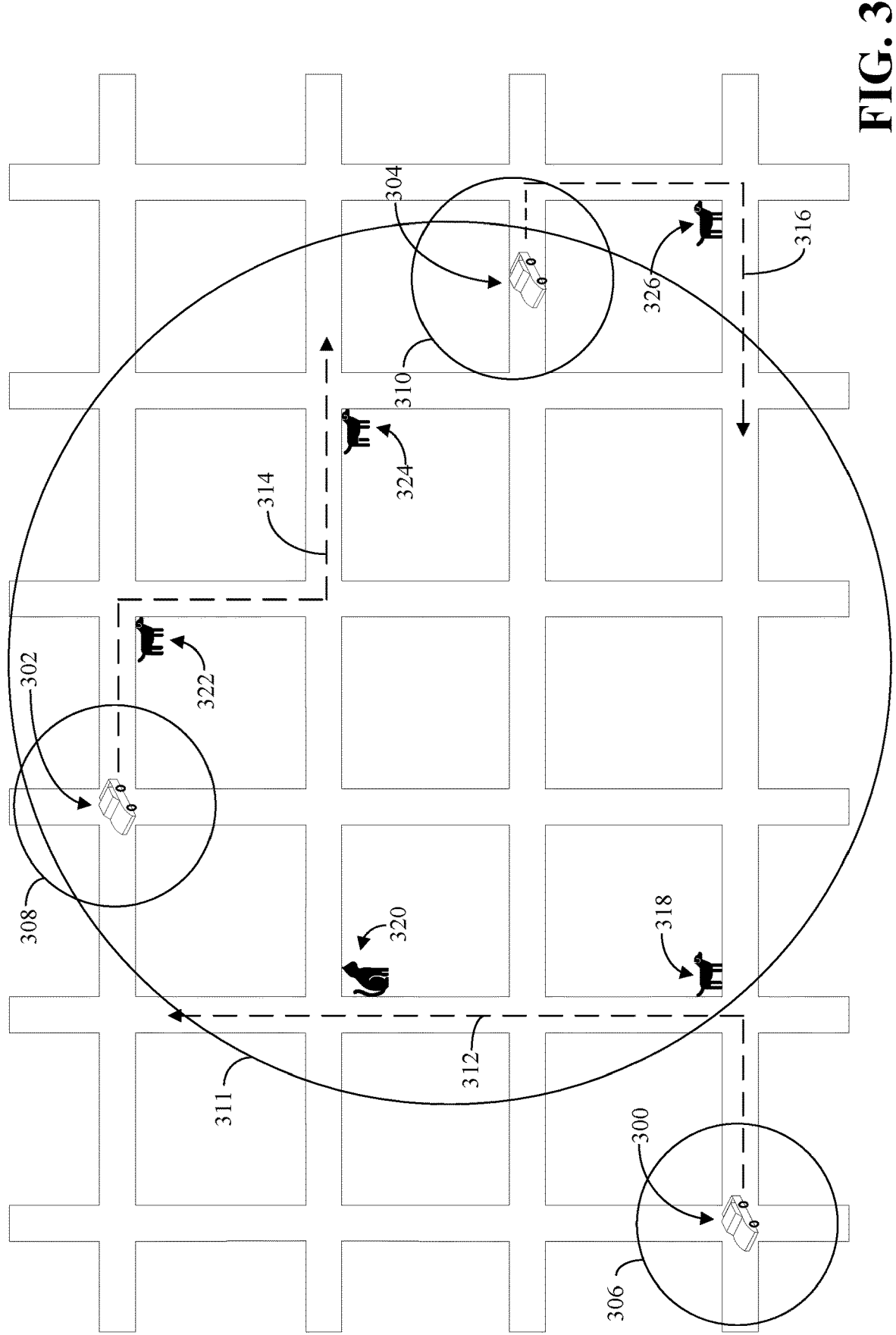
FIG. 3 illustrates an exemplary driving environment of a plurality of autonomous vehicles.

Turning now to FIG. 3, illustrated is an exemplary embodiment of searching for a specific object using the techniques described herein. In the illustrated embodiment, the computing system 102 is in communication with a plurality of autonomous vehicles, namely, a first autonomous vehicle 300, a second autonomous vehicle 302, and a third autonomous vehicle 304 (collectively referred to herein as autonomous vehicles 300-304). Each of the autonomous vehicles 300-304 travel along a different predefined route. More particularly, the first autonomous vehicle 300 travels along route 312, the second autonomous vehicle 302 travels along route 314, and the third autonomous vehicle travels along route 316. Sensor systems in each of the autonomous vehicles 300-304 are configured to capture images of a range of an exterior environment around the autonomous vehicle. This range is symbolized by the circle around each autonomous vehicle, specifically range 306 for the first autonomous vehicle 300, range 308 for the second autonomous vehicle 302, and range 310 for the third autonomous vehicle 304.

A user can enter a search request for a missing dog into a device 104. The request can include one or more characteristic about the missing dog, e.g., that the dog is a yellow Labrador. This request is then sent to the computing system 102. The computing system 102 can then transmit a signal to one or more of the autonomous vehicles 300-304 when the autonomous vehicle enters or is in a search area 311. The signal indicates that the autonomous vehicle should search for the missing dog and to transmit to the computing system 102 any images that may contain the missing dog. The signal can further indicate that the autonomous vehicle should select for transmission to the computing system 102 images that contain a yellow dog.

As the first autonomous vehicle 300 travels along route 312, it may capture one or more image of a first object 318 and/or a second object 320. In the illustrated embodiment, the first object 318 comprises a yellow dog and the second object 320 comprises a cat. After capturing an image of the first object 318, the first autonomous vehicle 300 determines whether the first object 318 comprises a dog; if yes, then it determines whether the dog is yellow. Because the first object 318 meets both filter criteria, the first autonomous vehicle 300 will then send one or more image of the first object 318 to the computing system 102. Whereas, because the second object 320 comprises a cat, the second object 320 does not meet the initial filter criteria, the first autonomous vehicle 300 will not perform the second filter criteria nor send an image of the second object 320 to the computing system 102.

As the second autonomous vehicle 302 travels along route 314, it may capture one or more image of a third object 322 and/or a fourth object 324. In the illustrated embodiment, the third object 322 comprises a brown dog and the fourth object 324 comprises a yellow dog. After capturing an image of the third object 322, the second autonomous vehicle 302 determines whether the third object 322 comprises a dog; if yes, then it determines whether the dog is yellow. Because the third object 322 only meets the first criteria, the second autonomous vehicle 302 does not transmit an image of the third object 318 to the computing system 102. Whereas, because the fourth object 324 meets both filter criteria, the second autonomous vehicle 302 transmits an image of the fourth object 324 to the computing system 102.

As the third autonomous vehicle 304 travels along route 316, it leaves the search area 311 for the missing dog and, therefore, receives a signal from the computing system 102 indicating the third autonomous vehicle 304 should stop searching for the missing dog. Subsequent to receiving the stop search signal, the third autonomous vehicle 304 captures an image of a fifth object 326, which comprises a yellow dog. However, because the third autonomous vehicle 304 is outside the search area 311, the third autonomous vehicle 304 will not perform any filtering steps on the image of the yellow dog.

Subsequent to receiving the images from the first autonomous vehicle 300 and/or the second autonomous vehicle 302, the computing system 102 will then perform a second filtering of the images. The computing system 102 may determine whether the yellow dog comprises a yellow Labrador. If the first object 318 and/or the fourth object 324 comprises a yellow Labrador, its respective image will be transmitted from the computing system 102 to the device 104.

Figure 4:
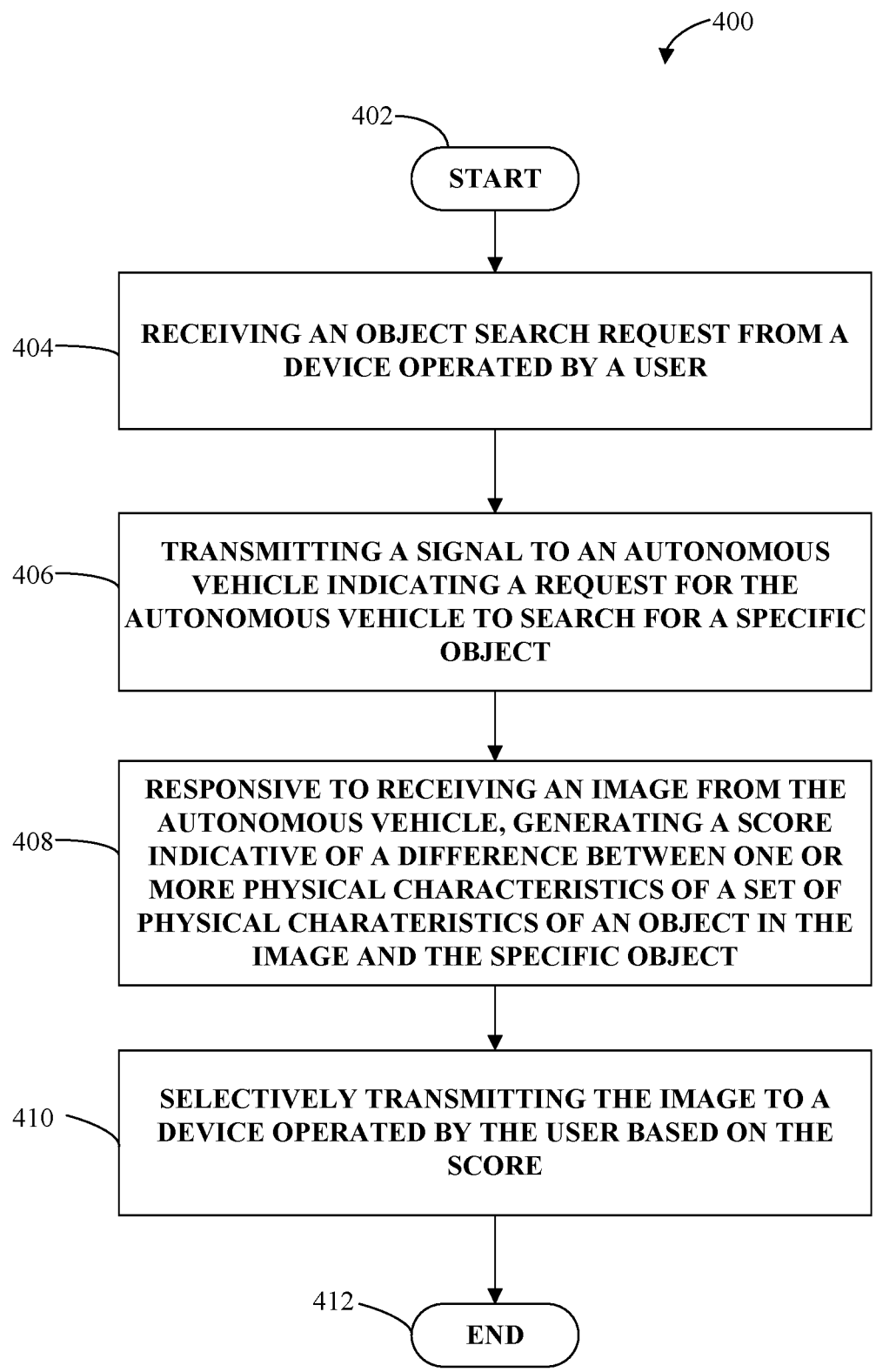
FIG. 4 is a flow diagram that illustrates an exemplary methodology executed by computing system for utilizing one or more autonomous vehicles to search for a specific object.

FIG. 4 illustrates an exemplary methodology relating to employing an autonomous vehicle to search for a specific object. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 4 an exemplary methodology 400 for employing an autonomous vehicle to search for a specific object is illustrated. The methodology 400 starts at 402, and at 404, a computing system receives an object search request from a device operated by a user. The object search request can indicate a request to search for a specific object in an area traversed by one or more autonomous vehicles. The object search request may include a set of physical characteristics of the specific object. At 406, responsive to receiving the object search request, the computing system transmits a signal to an autonomous vehicle indicating a request for the autonomous vehicle to search for the specific object. The signal may be configured to cause the autonomous vehicle to transmit a selected image captured by the autonomous vehicle to the computing system. The image selected for transmission may be selected based on a physical characteristic of the specific object. At 408, responsive to the computing system receiving the image from the autonomous vehicle, the computing system generates a score indicative of a difference between one or more physical characteristics of a set of a physical characteristics of an object in the image and the specific object. At 410, responsive to generating the score, the computing system may selectively transmit the image to the device operated by the user based on the score (e.g., when the score is below a threshold amount, etc.). The methodology 400 concludes at 412.

In an embodiment of the methodology 400, the signal can be transmitted to a fleet of autonomous vehicles. The autonomous vehicle may be in the fleet of autonomous vehicles. In another embodiment of the methodology 400, the object search request may include a geographic search range. The image selected for transmission to the computing system may be selected based on location of the autonomous vehicle when the image was captured. More particularly, only images captured within the search range may be transmitted to the computing system.

In a further embodiment of the methodology 400, different physical characteristics may be used for selecting which image is transmitted from the autonomous vehicle to the computing system and which image is transmitted from the computing system to the device. In yet another embodiment of the methodology 400, the specific object can comprise a dog and the set of physical characteristics can include one or more of breed of the dog, color of the dog, height of the dog, age of the dog, or weight of the dog. In a version of this embodiment, the image selected for transmission to the device may be further selected based on whether the dog is attached to a leash held by a person.

Figure 5:
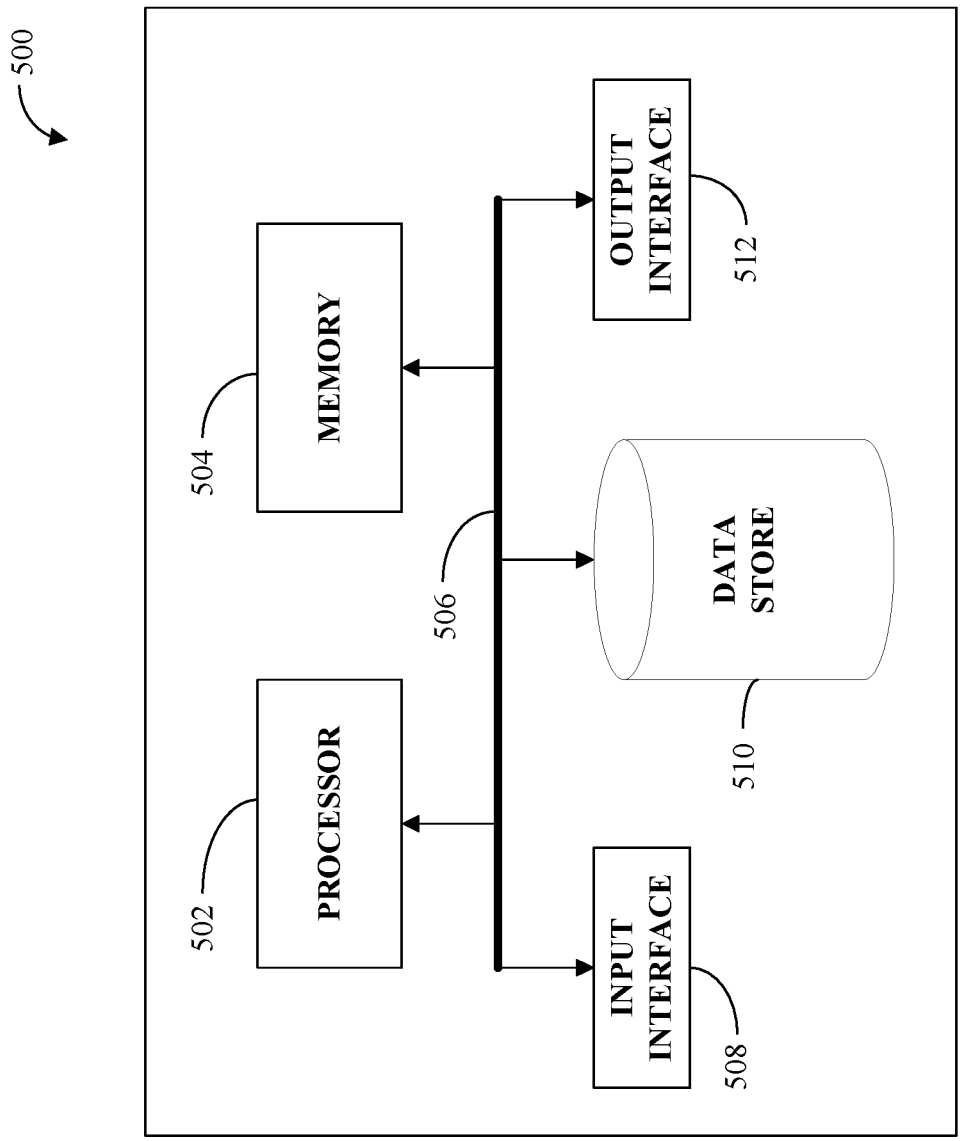
FIG. 5 illustrates an exemplary computing system.

Referring now to FIG. 5, a high-level illustration of an exemplary computing device that can be used in accordance with the systems and methodologies disclosed herein is illustrated. For instance, the computing device 500 may be or include the mobile computing device or the computing system. The computing device 500 includes at least one processor 502 that executes instructions that are stored in a memory 504. The instructions may be, for instance, instructions for implementing functionality described as being carried out by one or more components discussed above or instructions for implementing one or more methods described above. The processor 502 may be a GPU, a plurality of GPUs, a CPU, a plurality of CPUs, a multi-core processor, etc. The processor 502 may access the memory 504 by way of a system bus 506. In addition to storing executable instructions, the memory 504 may also store images, data specifying characteristics of specific objects, etc.

The computing device 500 additionally includes a data store 510 that is accessible by the processor 502 by way of the system bus 506. The data store 510 may include executable instructions, images, data specifying characteristics of specific objects, etc. The computing device 500 also includes an input interface 508 that allows external devices to communicate with the computing device 500. For instance, the input interface 508 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
a processor; and
memory that stores computer-executable instructions that, when executed by the processor, cause the processor to perform acts comprising:
receiving an object search request from a user of the computing device, the object search request identifies a specific object for which a search is performed in a geographic area;
causing an autonomous vehicle to passively search images captured by the autonomous vehicle for the specific object in the geographic area while the autonomous vehicle travels in the geographic area; and
receiving an image captured by the autonomous vehicle responsive to the autonomous vehicle passively searching the images for the specific object in the geographic area.

2. The computing device of claim 1, wherein the object search request specifies a search area.

3. The computing device of claim 1, wherein a size of a search area is predefined based on a type of the specific object.

4. The computing device of claim 1, wherein the object search request specifies a physical characteristic of the specific object, and wherein an object depicted in the image comprises the physical characteristic.

5. The computing device of claim 1, wherein the specific object comprises a specific person.

6. The computing device of claim 1, wherein the specific object comprises a specific animal.

7. The computing device of claim 1, wherein the object search request comprises a photograph of the specific object for which the search is performed.

8. The computing device of claim 1, wherein a plurality of autonomous vehicles in a fleet passively search images respectively captured by the autonomous vehicles for the specific object in the geographic area, and wherein the plurality of autonomous vehicles comprises the autonomous vehicle.

9. The computing device of claim 1, wherein a route of the autonomous vehicle is set by a third-party user independent of the object search request.

10. The computing device of claim 1, the acts further comprising:
prompting the user of the computing device to enter information specifying a characteristic of the specific object responsive to the user entering the object search request.

11. The computing device of claim 1, wherein the autonomous vehicle is caused to passively search the images captured by the autonomous vehicle for the specific object in the geographic area by transmitting a request to a server computing system, wherein the server computing system identifies the autonomous vehicle to perform the search in the geographic area.

12. The computing device of claim 1, wherein the autonomous vehicle is caused to discontinue passively searching the images for the specific object when the autonomous vehicle exits a search area.

13. A method performed by a computing device, comprising:
receiving an object search request from a user of the computing device, the object search request identifies a specific object for which a search is performed in a geographic area;
causing an autonomous vehicle to passively search images captured by the autonomous vehicle for the specific object in the geographic area while the autonomous vehicle travels in the geographic area, wherein a route of the autonomous vehicle is set by a third-party user independent of the object search request; and
receiving an image captured by the autonomous vehicle responsive to the autonomous vehicle passively searching the images for the specific object in the geographic area.

14. The method of claim 13, wherein the object search request specifies a search area.

15. The method of claim 13, wherein the object search request specifies a physical characteristic of the specific object, and wherein an object depicted in the image comprises the physical characteristic.

16. The method of claim 13, wherein the object search request comprises a photograph of the specific object for which the search is performed.

17. The method of claim 13, further comprising:
prompting the user of the computing device to enter information specifying a characteristic of the specific object responsive to the user entering the object search request.

18. The method of claim 13, further comprising:
transmitting a request to a server computing system to cause the autonomous vehicle to passively search the images captured by the autonomous vehicle for the specific object in the geographic area, wherein the server computing system identifies the autonomous vehicle to perform the search in the geographic area.

19. The method of claim 13, wherein the autonomous vehicle is caused to discontinue passively searching the images for the specific object when the autonomous vehicle exits a search area.

20. A method performed by a server computing system, comprising:
receiving a search request from a computing device, the search request identifies a specific object for which a search is performed in a geographic area;
identifying an autonomous vehicle to perform the search in the geographic area;
transmitting a request to the autonomous vehicle, wherein the request causes the autonomous vehicle to passively search images captured by the autonomous vehicle for the specific object in the geographic area while the autonomous vehicle travels in the geographic area;
receiving a subset of the images captured by the autonomous vehicle responsive to the request, wherein a set of received images received by the server computing system comprises at least the subset of the images captured by the autonomous vehicle;
selecting an image from the set of the received images based on the search request; and transmitting the image to the computing device.

* * * * *